United States Patent [19] | [11] 4,236,175
Groothuis | [45] Nov. 25, 1980

[54] CONVERTER CIRCUIT AND MONOCHROME PICTURE DISPLAY DEVICE COMPRISING SUCH A CONVERTER CIRCUIT

[75] Inventor: Hermanus H. H. Groothuis, Eindhoven, Netherlands

[73] Assignee: U.S. Philips Corporation, New York, N.Y.

[21] Appl. No.: 8,915

[22] Filed: Feb. 2, 1979

[30] Foreign Application Priority Data

Feb. 15, 1978 [NL] Netherlands ........................ 7801690

[51] Int. Cl.$^{3}$ ............................................ H04N 9/52
[52] U.S. Cl. ........................................ 358/30; 358/37
[58] Field of Search ........................ 358/1, 30, 37, 147

[56] References Cited

U.S. PATENT DOCUMENTS

| | | | |
|---|---|---|---|
| 2,946,846 | 7/1960 | Schroeder | 358/30 |
| 3,382,317 | 5/1968 | Sandler | 358/30 |
| 3,536,826 | 10/1970 | McMann | 358/37 |
| 3,729,580 | 4/1973 | Schneider | 358/37 |
| 4,160,264 | 7/1979 | Hailey | 358/30 |

*Primary Examiner*—Richard Murray
*Assistant Examiner*—Michael A. Masinick
*Attorney, Agent, or Firm*—Thomas A. Briody; William J. Streeter; Edward W. Goodman

[57] ABSTRACT

To display bivalent color signals in a monochrome picture display device so that the original color remains recognizable by choosing a suitable luminance ratio, and colors having a low brightness are displayed with a sufficient degree of visibility, the combination of a sum signal and a correction signal is formed from the bivalent color signal, wherein the color differences are derived from the sum signal and the correction signal ensures the basic luminance.

5 Claims, 5 Drawing Figures

CONVERTER CIRCUIT AND MONOCHROME PICTURE DISPLAY DEVICE COMPRISING SUCH A CONVERTER CIRCUIT

BACKGROUND OF THE INVENTION

The invention relates to a converter circuit, having three inputs to each one of which a bivalent color signal R, G or B is supplyable, for converting these bivalent color signals into a monochromatic signal (Y) obtainable at an output thereof with an amplitude which is different for each color combination, the converter circuit comprising an adder circuit.

Wireless World no. 1486, June 1976 page 53 and no 1480 December 1975 page 565, discloses a converter circuit of the above-defined type for obtaining a monochromatic signal from a color signal combination obtained from a Teletext or Viewdata signal. The grey scale obtained with this circuit is poor and is unsatisfactory for color signals corresponding to low brightnesses.

SUMMARY OF THE INVENTION

It is an object of the invention to provide a means with which the grey scale can be improved.

A converter circuit of the type defined in the opening paragraph is therefore characterized in that the converter circuit also comprises a non-linear circuit for obtaining a range of increased amplitudes of the monochromatic signal for color signal combinations corresponding to the lowest amplitudes, differing from zero, of the monochromatic signal.

The use of a non-linear circuit in combination with the adder circuit furnishes the possibility to obtain an improved grey scale, as will be apparent from the description of the embodiments.

A further implementation of a converter circuit according to the invention is characterized in that the adder circuit has three color signal inputs for receiving the bivalent color signals R, G and B, respectively, which are added by the adder circuit in an amplitude ratio a:b:c, while the converter circuit comprises, in addition, a circuit whose inputs are coupled to said color signal inputs and from an output of which the sum is obtained of a sum signal (aR+bG+cB) furnished by the adder circuit, and a bivalent correction signal (RvGvB), which is zero when all color signals are zero and which differs from zero when at least one of the color signals differs from zero and wherein the amplitude ratio of the correction signal to the sum signal is d:e, so that a signal e (aR+bG+cB)+d(RvGvB) to be displayed, is obtained, wherein d and e≠0 and a≠b≠c.

By deriving a signal from the bivalent color signals in the manner defined above, characters of the color having the lowest brightness are also clearly displayed due to the signal component d (RvGvB), whereas the distinction in the characters of a different color is ensured by the signal component e (aR+bG+cB).

If the ratio a:b:c, which is customary in color television for composing the luminance signal, is practically set at 3:6:1, an excellent display of the characters is obtained if e:d is practically set at 1:5.

DESCRIPTION OF THE DRAWINGS

The invention will now be further explained with reference to the accompanying drawings.

In the drawings

DESCRIPTION OF THE PREFERRED EMBODIMENTS

Figure 1:
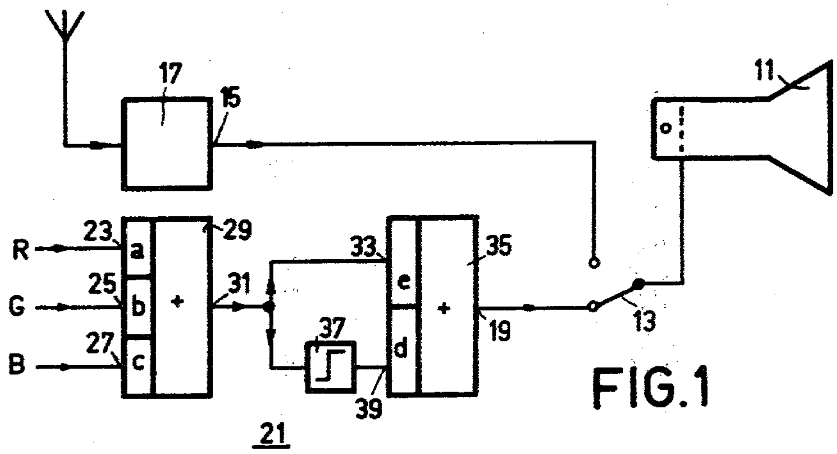
FIG. 1 shows, by means of a concise block diagram, a monochromatic picture display device having a converter circuit according to the invention.

Referring to FIG. 1, a signal which can be obtained by means of a selection switch 13 from an output 15 of a television receiving section 17 or from an output 19 of a converter circuit 21 is applied to a picture display tube 11.

Scanning the picture screen of the display tube 11 can be done in any known manner and the relevant circuitry is not shown in the Figure.

The converter circuit 21 has three inputs 23, 25, 27 to which bivalent color signals R, G and B can be applied. The amplitude of these signals may have a value zero or a value unequal to zero, which is assumed to be identical for all three signals.

The inputs 23, 25, 27 are at the same time inputs of an adder circuit 29 in which the signals R, G and B are added together in a mutual amplitude ratio a:b:c so that a signal (aR+bG+cB) is produced at an output 31 thereof. This signal is applied to an input 33 of a circuit 35 and through a limiting amplifier 37, which functions as a non-linear circuit, to an input 39 of the circuit 35. The amplifier 37 limits the amplitude of the signal at the input 39 to a value which is assumed to be equal to unity, which also applies to the original color signals R, G and B. The circuit 35 adds the signals at the inputs 33 and 39 together in an amplitude ratio e:d, so that the signal at the output 19 of the converter circuit 21, which is also the output of the circuit 35, may be written as d(RvGvB)+e(aR+bG+cB).

Herein the term (RvGvB), the bivalent correction signal, where v represents or has a value of zero if the signals R, G and B have the value zero and a value which differs from zero if at least one of the signals R, G and B has a value which differs from zero. When a signal value which is unequal to zero is displayed, this term furnishes a certain basic luminance on the picture screen of the picture display tube 11 which renders all characters properly visible if a suitable value is chosen for the factor d.

The term (aR+bG+cB), the denominated sum signal, furnishes a luminance which depends on the color of the original character if the factors a, b and c are given mutually different values. An advantageous choice for the ratio a:b:c is a ratio which is substantially 3:6:1, as customary for the composition of a luminance signal in the display of color signals.

The factors d and e which determine the amplitude ratio between the two terms are then preferably chosen so that d:e is substantially equal to 5:1.

Figure 2:
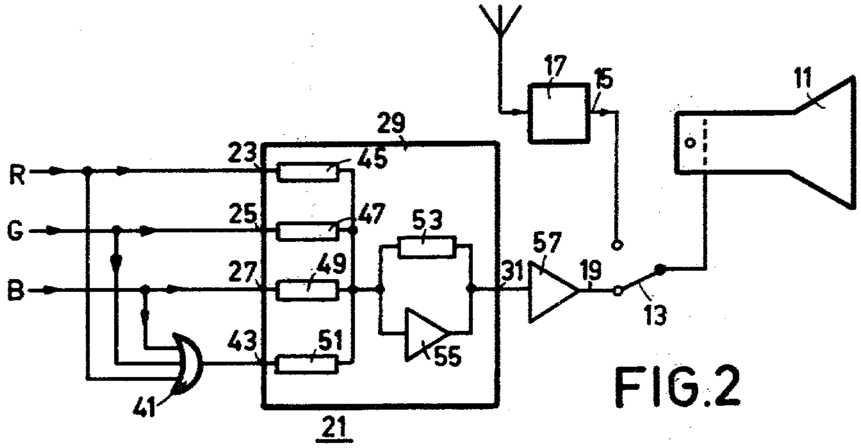
FIG. 2 shows another embodiment of a monochromatic picture display device having a converter circuit according to the invention.

Components corresponding to components of FIG. 1 have been given the same reference numerals in FIG. 2.

In the converter circuit 21 the amplifier 37 of FIG. 1 is replaced by an OR-gate 41 which functions as the non-linear circuit and whose output is connected to a fourth input 43 of the adder circuit 29. The inputs of the OR-gate 41 are connected to the inputs 23, 25, 27 of the converter circuit 21. The OR-gate 41 supplies the correction signal (RvGvB).

The adder circuit 29 has its several inputs connected to one end of a resistor 53 and to an input of an amplifier 55, namely the input 23 via a resistor 45, the input 25 via a resistor 47, the input 27 via a resistor 49 and the input 43 via a resistor 51. The other end of the resistor 53 is connected to an output of the amplifier 55 which at the same time constitutes the output 31 of the adder circuit 29.

If the value of the resistor 53 is chosen equal to x the values of the resistors 45, 47, 49 and 51 must be equal to $$\frac{1}{ae}x, \frac{1}{be}x, \frac{1}{ae}x \text{ and } \frac{1}{d}x,$$

respectively. The signal $-[d(RvGvB)+e(aR+bG+cB)]$, whose sign is corrected by an amplifier 57, appears at the output 31 of the adder circuit 29. The same result can be obtained by connecting the input 43 of the adder circuit 29 to an adjustable d.c. voltage via a switch which is operated by the gate 41. Resistor 51 can then have another value.

Figure 3:
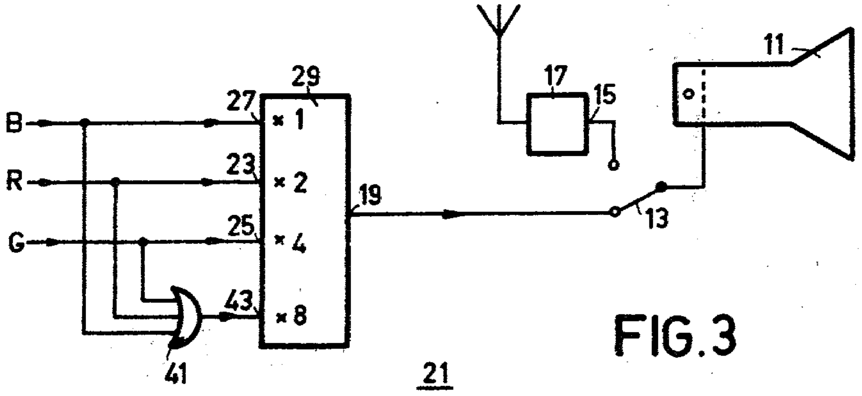
FIG. 3 shows a monochromatic picture display device having a converter circuit according to the invention, which utilizes a digital-to-analog converter.

Components in FIG. 3 which correspond to components of the preceding Figures have been given the same reference numerals.

In this case the adder circuit 29 is a digital-to-analog converter. The output signal of the OR-gate 41 is applied to the most significant input 43 and, in an order of decreasing significance, the signals G, R and B are applied to the inputs 25, 23 and, respectively. Then there is produced at the output 19 a signal 8 (RvGvB)+(2R+4G+B) in which the basic luminance signal 8 (RvGvB) has indeed a somewhat greater amplitude than in the above-mentioned advantageous case, but which also furnishes a very satisfactory reproduction by means of a circuit which can be implemented in a simple manner.

In addition, the circuits of FIG. 1 and FIG. 3 have the advantage, compared to those of FIG. 2, that they also work if one of the coefficients a, b or c would be made equal to zero.

It will be clear that in the above-described embodiments, the output signal of the converter circuit 21 can be amplified or attenuated to a still greater extent, if so desired. If the signals are given different polarities, the adder circuits and the gate circuits must be adapted thereto. It is obvious that the OR-function of the gate circuit can also be performed by means of logic circuits which are different from the above-defined OR-gate.

There is no need for the sum signal and the correction signal to be generated separately, as will be explained with reference to the following embodiments.

Figure 4:
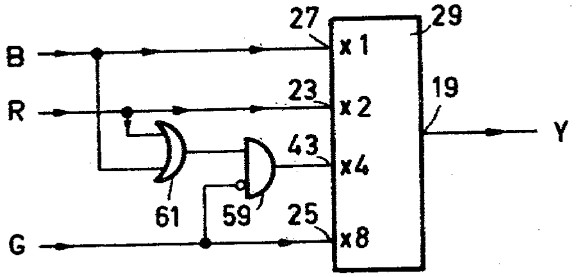
FIG. 4 shows another implementation of a converter circuit according to the invention.

In FIG. 4 in which the same reference numerals are used for corresponding components as in the other Figures, a signal originating from an AND-gate 59 is applied to the input 43 of the digital-to-analog converter 29, an inverted G-signal and an output signal (RvB) of an OR-gate 61 being applied to the inputs of AND-gate 59. The signals R and B are applied to the inputs of the OR-gate 61 so that the signal at the input 43 is equal to G′(RvB). The following truthtable will clearly show that, also in this case, an output signal is obtained having a high basic luminance and a linearly increasing luminance signal amplitude Y, wherein Y=8P+4Q+2S+T.

| G | R | B | Y | P | Q | S | T |
|---|---|---|---|---|---|---|---|
| 0 | 0 | 0 | 0 | 0 | 0 | 0 | 0 |
| 0 | 0 | 1 | 5 | 0 | 1 | 0 | 1 |
| 0 | 1 | 0 | 6 | 0 | 1 | 1 | 0 |
| 0 | 1 | 1 | 7 | 0 | 1 | 1 | 1 |
| 1 | 0 | 0 | 8 | 1 | 0 | 0 | 0 |
| 1 | 0 | 1 | 9 | 1 | 0 | 0 | 1 |
| 1 | 1 | 0 | 10 | 1 | 0 | 1 | 0 |
| 1 | 1 | 1 | 11 | 1 | 0 | 1 | 1 |

P = GR′B′ v GR′B v GRB′ v GRB = G
Q = G′R′B′ b G′RB′ v G′RB = G′R′B′ v G′R = G′ (R v B)
S = G′RB′ v G′RB v GRB′ v GRB = R
T = G′R′B v G′RB v GR′B v GRB = B

Figure 5:
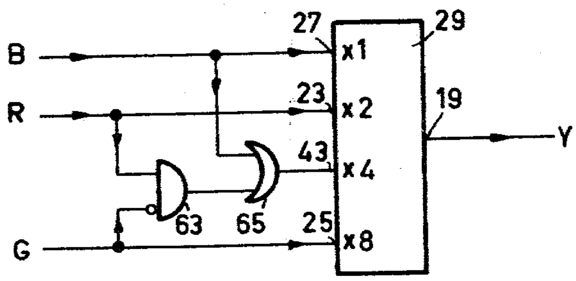
FIG. 5 shows a further possible implementation of a converter circuit as shown in FIG. 4.

The following truth table applies for FIG. 5.

| G | R | B | Y | P | Q | S | T |
|---|---|---|---|---|---|---|---|
| 0 | 0 | 0 | 0 | 0 | 0 | 0 | 0 |
| 0 | 0 | 1 | 5 | 0 | 1 | 0 | 1 |
| 0 | 1 | 0 | 6 | 0 | 1 | 1 | 0 |
| 0 | 1 | 1 | 7 | 0 | 1 | 1 | 1 |
| 1 | 0 | 0 | 8 | 1 | 0 | 0 | 0 |
| 1 | 0 | 1 | 9 | 1 | 0 | 0 | 1 |
| 1 | 1 | 0 | 14 | 1 | 1 | 1 | 0 |
| 1 | 1 | 1 | 15 | 1 | 1 | 1 | 1 |

P = GR′B′ v GR′B v GRB′ v GRB = G
Q = G′R′B v G′RB v G′RB v GRB′ v GRB = R v BG′
S = G′RB′ v G′RB v GRB′ v GRB = R

The term RvBG′ is realized by means of an AND-gate 63 and an OR-gate 65. A non-linear increase of the luminance signal amplitude is obtained.

For completeness, the truth table for FIG. 3 is given herebelow.

| G | R | B | Y | P | Q | S | T |
|---|---|---|---|---|---|---|---|
| 0 | 0 | 0 | 0 | 0 | 0 | 0 | 0 |
| 0 | 0 | 1 | 9 | 1 | 0 | 0 | 1 |
| 0 | 1 | 0 | 10 | 1 | 0 | 1 | 0 |
| 0 | 1 | 1 | 11 | 1 | 0 | 1 | 1 |
| 1 | 0 | 0 | 12 | 1 | 1 | 0 | 0 |
| 1 | 0 | 1 | 13 | 1 | 1 | 0 | 1 |
| 1 | 1 | 0 | 14 | 1 | 1 | 1 | 0 |
| 1 | 1 | 1 | 15 | 1 | 1 | 1 | 1 |

P = G′R′B v G′RB′ v G′RB v GR′B′ v GR′B v GRB′ v GRB = G v R v B
Q = GR′B′ v GR′B v GRB′ v GRB = G
S = G′RB′ v G′RB v GRB′ v GRB = R
T = G′R′B v G′RB v GR′B v GRB = B

It will be clear that another desired amplitude variation of the luminance signal Y can be obtained by means of other gate circuits.

Alternatively it is possible to adapt the luminance signal by means of an adder circuit having multiplication factors differing from the above-mentioned 8, 4, 2 and 1, and adapted gate circuits.

What is claimed is:

1. A converter circuit, having three inputs to each one of which a bivalent color signal (R, G and B) is supplied, for converting these bivalent color signals into a monochromatic signal (Y) appearing at an output thereof, having an amplitude which is different for each color combination, the converter circuit comprising an adder circuit and a non-linear circuit coupled to the adder circuit for obtaining a plurality of increased amplitudes of the monochromatic signal for color signal combinations corresponding to the lowest amplitude, differing from zero, of the monochromatic signal.

2. A converter circuit as claimed in claim 1, wherein the adder circuit includes three color signal inputs to which the bivalent color signals R and G and B, respectively, are applied, said adder circuit having an amplitude ratio a:b:c which is applied respectively to said bivalent color signals R, G and B when said signals are added together; and wherein the non-linear circuit comprises a circuit having inputs coupled to said color signal inputs and an output, said non-linear circuit further having means coupled to said circuit inputs for forming a bivalent correction signal (RvGvB), which is zero if all color signals are zero and which differs from zero if at least one of the color signals differs from zero, means coupled to said adder circuit for adding the sum signal (aR+bG+cB), formed by said adder circuit, to said bivalent correction signal, and means for applying an amplitude ratio d:e, respectively, to said bivalent correction signal and said sum signal when said signals are added, whereby a resultant signal e(aR+bG+cB)+d(RvGvB) appearing at said output is obtained, and wherein d and $e \neq 0$ and $a \neq b \neq c$.

3. A converter circuit as claimed in claim 2, wherein a:b:c is substantially 3:6:1 and d:e is substantially 5:1.

4. A converter circuit as claimed in claim 2, wherein the adder circuit includes a fourth input, and said non-linear circuit comprises an OR-gate circuit having an output coupled to said fourth input and inputs each of which is coupled to one of said color signal inputs.

5. A converter circuit as claimed in claim 4, wherein the adder circuit is a digital-to-analog converter having a plurality of inputs in which the most significant input thereof is coupled to the ouput of the gate circuit while the remaining inputs of the digital-to-analog converter are coupled in order of decreasing significance to the G, R and B-color signal inputs, respectively.

* * * * *